US011811854B2

(12) United States Patent
Rasool

(10) Patent No.: US 11,811,854 B2
(45) Date of Patent: Nov. 7, 2023

(54) DELIVERY OF DIGITAL VIDEO CONTENT BASED UPON GEOGRAPHIC LOCATION

(71) Applicant: SLING MEDIA PVT LTD, Bangaluru (IN)

(72) Inventor: Mohammed Rasool, Bangalore (IN)

(73) Assignee: DISH Network Technologies India Private Limited

(*) Notice: Subject to any disclaimer, the term of this patent is extended or adjusted under 35 U.S.C. 154(b) by 0 days.

(21) Appl. No.: 16/729,678

(22) Filed: Dec. 30, 2019

(65) Prior Publication Data

US 2020/0213384 A1 Jul. 2, 2020

Related U.S. Application Data

(60) Provisional application No. 62/786,543, filed on Dec. 30, 2018.

(51) Int. Cl.
| | |
|---|---|
| *G06F 15/16* | (2006.01) |
| *H04L 67/04* | (2022.01) |
| *H04L 67/52* | (2022.01) |
| *H04L 67/62* | (2022.01) |
| *H04L 67/50* | (2022.01) |
| *H04L 67/5681* | (2022.01) |

(52) U.S. Cl.
CPC ............. *H04L 67/04* (2013.01); *H04L 67/52* (2022.05); *H04L 67/535* (2022.05); *H04L 67/5681* (2022.05); *H04L 67/62* (2022.05)

(58) Field of Classification Search
CPC ....... H04L 67/04; H04L 67/18; H04L 67/325; H04L 67/2847; H04L 67/22; H04L 65/80; H04L 65/4084; H04N 21/8456; H04N 21/26258; H04N 21/42202; H04N 21/4318; H04N 21/41407; H04N 21/44209; H04N 21/4524; H04N 21/41422; H04W 4/029
See application file for complete search history.

(56) References Cited

U.S. PATENT DOCUMENTS

| | | | |
|---|---|---|---|
| 8,495,237 B1 * | 7/2013 | Bilinski | H04L 65/762 709/224 |
| 9,247,523 B1 | 1/2016 | Bhatia et al. | |
| 9,602,621 B2 * | 3/2017 | Ozawa | H04L 67/2847 |
| 2013/0308470 A1 * | 11/2013 | Bevan | H04W 36/32 370/252 |
| 2014/0067257 A1 * | 3/2014 | Dave | H04W 4/40 701/423 |
| 2015/0105098 A1 * | 4/2015 | Sridhara | G01S 5/02 455/456.1 |

(Continued)

*Primary Examiner* — John B Walsh
(74) *Attorney, Agent, or Firm* — KW Law, LLP

(57) ABSTRACT

Media streaming to a phone, tablet or other mobile device is improved by adapting requests for content in anticipation of the device's future location. If a device is expected to pass through an area with poor wireless signal quality, then requests for media content can be pre-emptively obtained beforehand at places and times where the available bandwidth is more favorable. Further, requests for content may be delayed during lower bandwidth conditions if the device is expected to soon encounter more bandwidth. Content requests can be therefore optimized (or at least improved) based upon the expected bandwidth that will be encountered during the anticipated upcoming movement of the device.

14 Claims, 3 Drawing Sheets

(56) References Cited

U.S. PATENT DOCUMENTS

| | | |
|---|---|---|
| 2015/0281303 A1 | 10/2015 | Yousef et al. |
| 2016/0065995 A1 | 3/2016 | Phillips |
| 2017/0208560 A1* | 7/2017 | Papa .................. H04W 52/241 |
| 2017/0272972 A1* | 9/2017 | Egner ............... H04W 28/0268 |
| 2018/0192391 A1* | 7/2018 | Venkatraman .......... H04W 4/90 |
| 2019/0044609 A1* | 2/2019 | Winkle ................ B64C 39/024 |
| 2019/0159162 A1* | 5/2019 | Hassan ................ G01S 5/0205 |
| 2020/0092019 A1* | 3/2020 | Wang ..................... H04W 4/33 |

* cited by examiner

DELIVERY OF DIGITAL VIDEO CONTENT BASED UPON GEOGRAPHIC LOCATION

PRIORITY CLAIM

This application claims priority to U.S. Provisional Patent Application Ser. No. 62/786,543 filed on Dec. 30, 2018, which is incorporated herein by reference.

TECHNICAL FIELD

The following discussion generally delivery of digital video content over a wireless network. More particularly, the following discussion relates to systems, processes and devices to improve the delivery of streaming video content to a client device while the client device is moving based upon expected geographic location of the device.

BACKGROUND

Streaming media can present numerous technical challenges, particularly when the client device that is receiving the media stream is a mobile device such as a telephone, tablet, portable computer or the like. One challenge that can arise is that as the device moves during the streaming session, different locations can have substantially different network conditions. Typical media players adapt their content requests based solely upon network conditions. When the network is good, the streaming is of very high quality and when the network is bad, the service reduces the quality based upon available bandwidth.

But as a user passes through a tunnel or under an overpass, for example, network service can be temporarily interrupted. Even if service continues, available bandwidth can vary substantially from location to location. Rural areas, for example, often have less network coverage than more metropolitan areas. Conversely, densely populated areas may have less available bandwidth, particularly at certain times of the day. These variations in network availability based upon time and/or location can interrupt streaming videos during playback, or otherwise have adverse effects upon the user experience.

It is therefore desirable to create systems, devices and automated processes that can improve the delivery of streaming media content as the mobile device moves from geographic location to location.

BRIEF SUMMARY

Various embodiments relate to different automated processes, computing systems, devices and other aspects of a video streaming system that delivers digital media content, particularly video content, to a telephone, laptop, tablet or other mobile device. In various embodiments, the media stream is requested from a network server by a mobile device for delivery using adaptive streaming techniques.

Some embodiments relate to a mobile device having a processor, memory and input/output interfaces. The processor is configured to execute instructions stored in the memory to perform an automated process that comprises: determining, by the processor, an expected path of the mobile device; retrieving, by the processor, data that indicates a signal quality of a wireless signal encountered at each of a plurality of locations along the expected path of the mobile device; processing the data by the processor to identify one or more locations along the expected path of the mobile device having reduced signal quality; and adapting a schedule of requests for segments of a video stream based upon the processing to thereby reduce data delivery while the device is near the one or more locations along the expected path of the mobile device having reduced signal quality.

Other embodiments relate to an automated process executed by a mobile media player device, a network service and/or another computing device having a processor, memory and input/output interfaces. The automated process suitably comprises: determining, by the processor, an expected path of the mobile device; retrieving, by the processor, data that indicates a signal quality of a wireless signal encountered at each of a plurality of locations along the expected path of the mobile device; processing the data by the processor to identify one or more locations along the expected path of the mobile device having reduced signal quality; and adapting a schedule of requests for segments of a video stream based upon the processing to thereby reduce data delivery while the device is near the one or more locations along the expected path of the mobile device having reduced signal quality.

DRAWING FIGURES

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

Various embodiments improve media streaming by adapting requests for content in anticipation of the user's future location. If a user (or, more specifically, the user's phone or other device) is expected to pass through a lower-bandwidth location, then requests for media content can be pre-emptively obtained beforehand at places and times that the available bandwidth is more favorable. Additionally and/or alternatively, requests for content may be delayed during lower bandwidth conditions if the device is expected to soon encounter more bandwidth. Content requests can be optimized (or at least improved) based upon the expected bandwidth that will be encountered during the upcoming movement.

In various embodiments, the phone or other mobile device stores received signal strength indications (RSSI) or similar indicia of signal quality as the device moves during the day. The location tracking may be performed with reference to GPS coordinates, for example, or any other available reference. Signal strength/quality may be recorded locally and/or remotely as the device moves from place to place. Moreover, the movements may be identified to recognize regular movements (e.g., commutes, frequent travel routes, etc.) of the device. As the user moves through a recognized or repeated movement, the previously-stored signal quality data can be consulted to optimize (or at least improve) content delivery. Content can be retrieved while the signal is stronger, for example, to fill a cache that can be depleted when the signal is weaker. Adaptive streaming techniques based upon segments of varying quality can be exploited, for example, to pre-request higher quality segments while bandwidth allows. Several examples of basic adaptive streaming techniques are described in U.S. Pat. No. 7,818,444, although other techniques, processes and systems could be equivalently used.

Figure 1:
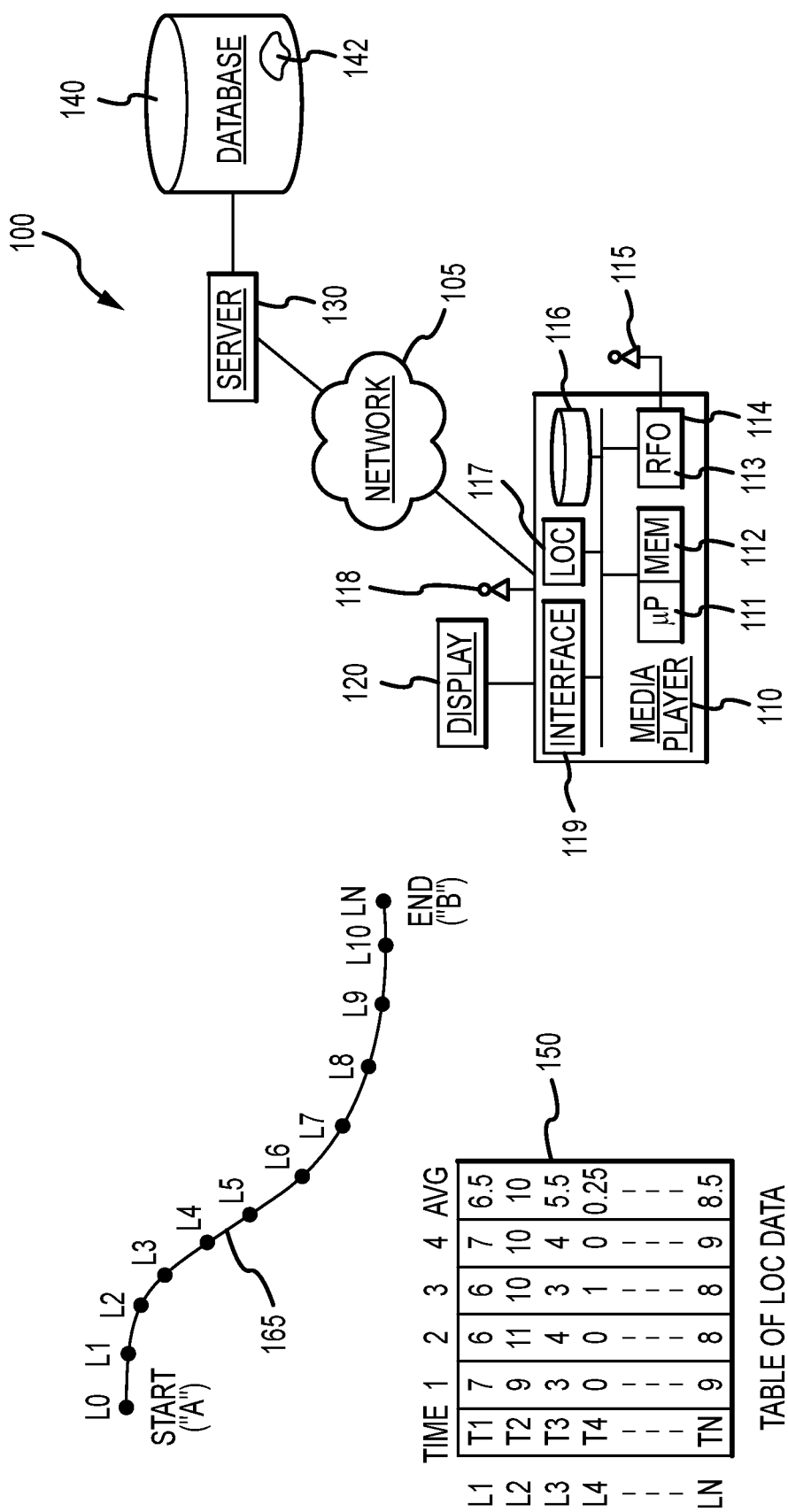
FIG. 1 is a diagram showing a system and mobile device that collects and/or processes location data to improve delivery of a media stream as the device moves from one position (e.g., "Start") to another (e.g., "End").

FIG. 1 illustrates one example wherein a media player other device 110 travels from point "A" to point "B" along a route that encounters points L0, L1, L2, L3, . . . , LN to an end at point "B". In this example, the device (or a network service in communication with the device) can build a map of the bandwidth, signal strength and/or other indicia of video quality as the device travels along the path 165. From L0 to LN. Of course FIG. 1 illustrates one example; equivalent embodiments may consider any number of points along any path, with points being regularly or irregularly spaced as desired.

Device 110 suitably stores the quality measurements that are obtained at the various points along path 165 in a database or other structure 150. In the example shown in FIG. 1, structure 150 shows a two-dimensional structure that records measurements taken at different times for various locations. Example structure 150 also records one or more measurement times, as well as an average value for signal strength encountered at each point on path 165. Other embodiments could be structured in other ways, with additional or alternate data recorded, or with less data stored (e.g., only average values, without retaining individual measurements). Still other embodiments may transmit measurement data to a network service 130, if desired, for cloud-based computations and storage of data. Computations performed by server 130 may include path recognition, data averaging or other smoothing, and/or other computations as desired. In some implementations, data 150 collected by multiple devices 110 may be aggregated into a shared database 142 maintained on a cloud-based storage 140 to permit "crowdsourced" data that may be more complete and/or accurate than data 150 recorded by any single device 110.

Data 150 (and/or aggregated data 142) may be processed locally by device no or remotely by service 140. In some embodiments, device no processes location data 150 to optimize (or at least improve) fetching of streaming media content or the like based upon expected future locations of the device no.

If, for example, the video streaming quality at location L3 is always (or at least usually) better than at location L4, then area L4 can be considered low signal area. To provide a smooth video experience, the video segments can be pre-fetched at better quality before the device enters the area of lower signal quality. If quality content is pre-fetched while the signal permits, then the user can treated to a more consistent user experience even while traversing areas of low signal quality. In a further example, suppose that the video streaming quality at L2 is regularly observed to be lower than at location L3. In the intermediate area following L2, then, the quality keeps improving. Instead of lowering the quality and prefetching low quality video segment while in area L2, then, the device no could instead wait to reach location L3 before downloading higher quality segments. Many additional examples could be formulated.

Various embodiments therefore build a map of streaming quality with respect to geographic location (see, e.g., data 150 in FIG. 1). As the device no passes the same (or nearby) locations at different times, signal quality measurements recorded in data 150 can be averaged or otherwise combined for better accuracy over time. The data 150 may also record time of day, day of week, seasonal data, etc. if desired to further improve predictability (e.g., some locations may be slower at certain dates/times than at others). Using this map and the probable commute (or other expected route) for the user, decisions can be made to decide when to pre-fetch or delay fetching of video segments.

Data map 150 can be built by a streaming app executing on the client device no and/or by service 140 based on the data 150 collected by users and can be built using data from third party sources. This data, when used in conjunction with user movement patterns, can be used to determine when to prefetch or delay fetching of video segments as the user moves along a predictable path 165. If a user regularly follows the same commute path, for example, the concepts described herein may be used to pre-fetch data (or post-fetch data) to avoid fetching while the user is in poor signal quality areas (e.g., areas near tunnels, underpasses, natural or human-made valleys, areas with poor wireless coverage, etc.). Similar techniques can be used when the device is moving across or within a building and/or as the device crosses low quality locations within a building or campus (elevator lifts, basements, shielded locations, etc.). These concepts may be particularly useful for transit riders, commuters, students, working professionals and many others.

Device 110 may represent any sort of media player, mobile phone, tablet, portable computer or other computing device as desired. The device no illustrated in FIG. 1 suitably includes a processor 111 and associated memory 112 that stores digital instructions executed by processor 111, as desired. Various embodiments will include a radio frequency (RF) interface 113 that includes a receive signal strength indicator (RSSI) 114. Interface 113 may provide wireless communications via antenna 115 or the like for cellular telephony, wireless local area or personal area networks (e.g., IEEE 802.11 networks), point-to-point communications (e.g., Bluetooth or other IEEE 802.15 communications), and/or any other wireless communications as desired. In various embodiments, RSSI readings indicating the received strength of cellular telephony signals are used to populate date 150, as desired.

As illustrated in FIG. 1, device no also includes a global positioning system (GPS) or other location detection interface 117 that determines the geographic position of the device no using, for example, signals received from a satellite cluster via antenna 118. Note that although antennas 118 and 115 are shown separately in FIG. 1, many practical embodiments will use an equivalent hybrid antenna that receives different frequencies for position determination and communications. FIG. 1 also shows an interface 119 to a display 120 that can be used to present streaming video, user interfaces and other graphical displays. Typical devices no will also include interfaces to a touchscreen, keyboard, microphone and/or the like to receive user inputs.

Media player devices no will typically include a non-transitory data storage 116 such as a magnetic, optical or solid state drive that can be used to store cached media content, data 150 and/or any other data as desired. Storage 116 is illustrated separately from memory 112 in this example, but in practice a common solid state or other storage could be used to store data 150, media content, and/or digital program instructions for execution by processor 111, as desired.

In practice, then, device 110 suitably records signal strength data at various locations as data 150. The signal strength data may be collected by RF interface 113 and associated with position data from location interface 117 in any manner for storage in local storage 116, remote storage 140, and/or elsewhere as desired. The various functions of device no generally occur under the control of processor in, which suitably executes digital instructions stored in memory 112, storage 116 and/or elsewhere as appropriate.

Figure 2:
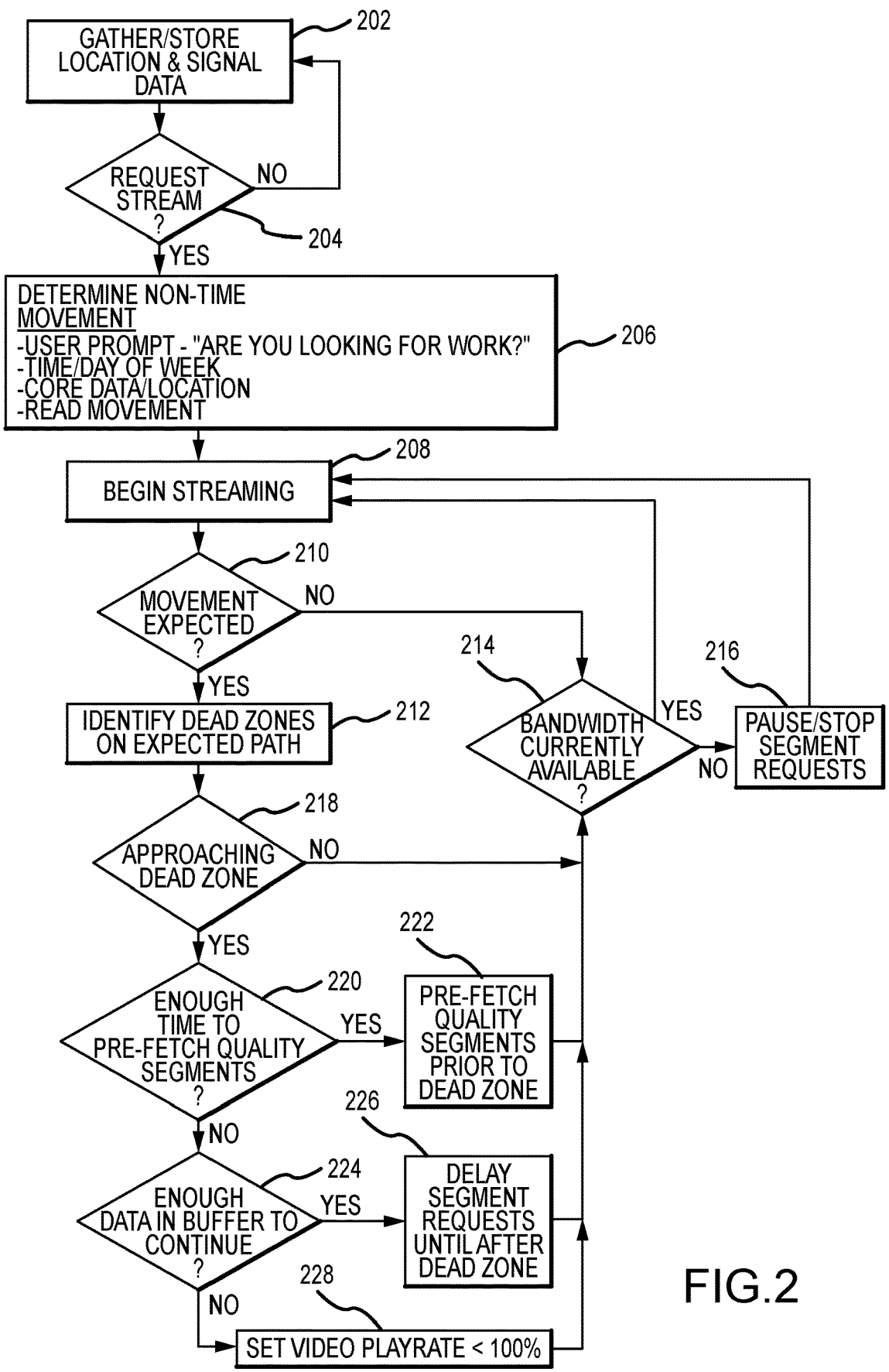
FIG. 2 is a flowchart of an example process for adapting delivery of a requested media stream to a mobile device.

FIG. 2 shows an example process 200 that could be automatically performed by processor 111 or the like to improve the delivery of streaming media content while the device no is moved from place to place, e.g., along path 165. Process 200 may be implemented in digital instructions stored in memory 112 and/or storage 116, as desired, for execution by processor 111.

As noted above, device no suitably gathers and stores location and signal strength data 150 for subsequent use (function 202). In some implementations, device 110 collects location and signal data as frequently as possible to maximize the scope of data 150. In various embodiments, collected data is shared with a remote service 140 via network 105, and/or location data obtained from other devices no is retrieved from remote service 140 via network 105 as needed. Information may be retrieved on a periodic or aperiodic basis, as desired. Other embodiments may send requests for signal measurements from service 140 to obtain information from anticipated future locations, as desired.

Path determination may occur as needed (function 206). In the example of FIG. 2, path determination 206 is performed in response to a user request to stream a media program (function 204), or in response to the user activating a media player application that provides streaming media. This is helpful if the process 200 instructions are coded into the media player application. Other embodiments, however, may perform path prediction 206 outside of the media player function, as desired.

Near term movement may be predicted in any number of different ways. In various embodiments, paths can be predicted based upon repeated behaviors (e.g., commutes or other regular movements), based upon expected movement at certain times of the day or week, based upon entering or leaving a geofence or other location determination (e.g., recognize that the user is leaving home or work), based upon recent movements, based upon an expected return to a known location (home or work) at certain times, and/or any number of other ways. Paths may be defined based upon historical observations, or the like.

If the user requests a video stream during expected movement, the stream is requested and delivered as expected (function 208). Video may be obtained from a video-on-demand (VOD) service, a remote storage digital video recorder (RSDVR), from a traditional service on network 105, and/or from any other source.

If the viewer requests a media stream to be delivered during expected movement of device 110 (function 210), then any "dead zones" or areas of anticipated poor signal quality are identified (function 212). When subsequent position reports indicate that the device is approaching a dead zone (function 218), then further analysis can be performed to reduce or avoid any adverse effects of the dead zone. If no dead zones are identified or encountered, then adaptive streaming can continue as normal (function 214).

If the device 110 is approaching a dead zone (function 218), however, then the device no determines whether enough time remains to pre-fetch higher quality media segments while sufficient bandwidth remains (function 220). If enough time remains, then upcoming segments of the media stream can be pre-fetched at higher quality and cached in storage 116 or elsewhere for later playback (function 222). The particular segments that are needed will typically be identified based upon playback time of the media stream in comparison to the expected duration of the dead zone during the device's movement. That is, if the device 110 anticipates a two minute dead zone, then at least two minutes of programming can be pre-fetched (assuming time allows before entering the dead zone).

If there is not sufficient time to pre-fetch needed segments (function 220), then the device no determines whether enough content is currently in the buffer to traverse the dead zone without additional content (function 224). If so, then payback can continue and segment requests may be delayed until later to make more efficient use of the limited bandwidth (function 226). Otherwise, various embodiments may reduce the playback rate (function 228) to stretch the currently-available content, or take other remedial actions as necessary to maintain the media stream, even at a lower quality. Other embodiments may simply pause playback and/or notify the viewer that better quality playback will resume when network conditions permit.

As noted above, the concepts set forth herein are very compatible with adaptive media streaming techniques in which "streamlets" or "segments" of relatively fixed duration are selected by the player from multiple copies of different quality available from a media server on network 105. If then-current conditions are insufficient to support playback at the current quality (function 214), then the media player adapts its requests sent to the server so that lower quality segments are obtained (function 216). Conversely, if network conditions improve, then better quality segments can be requested, as appropriate.

Many of the examples described herein describe systems and processes that could be executed locally by the phone, tablet or other device to improve media segment requests made by that device in subsequent media streaming. Equivalent embodiments could process route prediction and/or signal quality prediction using a "cloud based" or similar network server, as desired. In various embodiments, the location/quality data is gathered from one or more devices (e.g., crowdsourced) to facilitate even better prediction of signal strength along an upcoming route. Predicted signal strength data and/or a plan of segment requests could be forwarded from the network service to the relevant device to reduce the computational load on the device, as desired.

Figure 3:
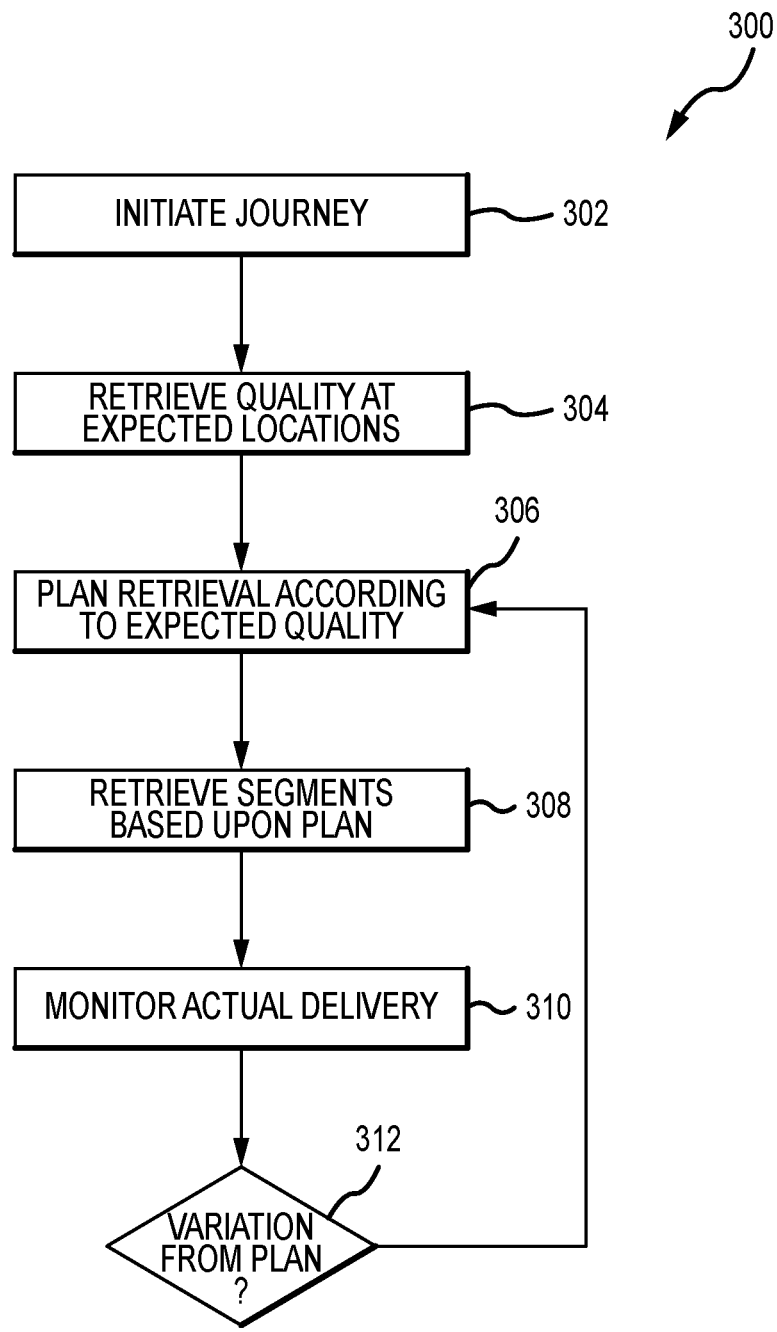
FIG. 3 is a flowchart of an example process executable by a mobile device and/or by a network server to plan and deliver a media stream based upon an expected travel path of the mobile device.

FIG. 3 shows an example process 300 that could be executed by a mobile device 110 and/or by a network server 130 to plan and deliver a media stream based upon an expected travel path of the mobile device. To that end, process 300 could be performed locally by processor 111 of the device 110, or remotely as part of a "cloud-based service" provided by one or more processors of network server 130. In some embodiments, the various functions shown in FIG. 3 could be divided between device 110 and service 130, with appropriate messages passed via network 105 to facilitate cooperative processing as desired. Still other embodiments may provide alternate, additional or different functions that could be organized and executed in any other equivalent manner.

Process 300 is initiated in any manner (function 300). As noted above, location prediction may be performed within a media player application executing on device 110, which would typically indicate that the process is initiated when the application is opened, or otherwise made active. Other embodiments may be initiated when a media stream is requested by the user. Still other embodiments may run as daemons or other background processes for more universal execution even when the media player application may not be active.

As noted above, the expected path 165 of device 110 may be determined in any manner (function 304), and expected quality measurements can be obtained for various points along the path 165. In various embodiments, signal quality is predicted based upon any combination of local data 150 stored on device 110 and remote data 142 stored on the cloud service database 140. In some embodiments, it may be particularly helpful to recognize "dead zones" so that sudden drops in video quality can be avoided. In other embodiments, it may be desirable to plan for some or all of the journey (function 306) so that locations of greatest signal quality/bandwidth can be exploited for maximum segment requests, while segment requests are reduced or even suspended while the device 110 is located in areas with lower signal quality/bandwidth. Segments of the media stream are then requested by the media device 110 according to the plan (function 308).

In various embodiments, it may be helpful to monitor actual segment delivery (function 310) in comparison to the plan in case updates are needed. If signal quality differs from the expected values, for example, segment requests may be delayed, or if signal quality improves, then perhaps video quality can be improved, or segment request timing may be altered to make use of the newly-available bandwidth.

Still further embodiments may monitor location data collected by device no to track any variation from the expected location that may necessitate changes to the video streaming plan. If the user takes a different route as part of a morning or evening commute, for example, then different dead zones may occur. If the device no is found to be in an unknown location (or a location in which no previous signal strength data 150 is available locally), then device no may query service 130 to request signal strength data in some embodiments. The requested data may then be used to create a new segment request plan, as desired.

As noted above, process 300 may be equivalently performed by network service 130 or the like. In such embodiments, multiple devices no report signal data at various locations (e.g., with reference to GPS coordinates or the like) to service 130 for storage in database 140. Path computation may be performed locally be device no, if desired, and the path may be submitted to service 130 to determine a media segment request plan based upon the content of database 140 in comparison to the submitted path. The determined segment request plan for the appropriate media stream is then generated by service 130 and delivered to device 110 via network 105 for execution. Updates may be handled locally by device no and/or submitted for cloud-based processing by service 130 as desired.

Various systems, devices and automated processes have been described herein. This document is not intended to limit the scope of any claims or inventions in any way, and the various components and aspects of the system described herein may be separately implemented apart from the other aspects.

What is claimed is:

1. A mobile device having a processor, memory and input/output interfaces, wherein the processor is configured to execute instructions stored in the memory to perform an automated process that comprises:

measuring, by the mobile device, a signal quality at each of a plurality of various locations as the mobile device visits the various locations to obtain a plurality of signal quality measurements;

averaging, by the mobile device, the signal quality measurements encountered at each of the various locations as the mobile device visits the various locations at different times;

storing the averaged signal quality measurements in the memory of the mobile device;

creating, by the processor of the mobile device, a schedule of requests for segments of a video stream;

determining, by the processor of the mobile device, an expected path of the mobile device;

retrieving, from the memory by the processor, the averaged signal quality measurements indicating the average signal quality of the wireless signal at each of a plurality of locations along the expected path of the mobile device;

identifying, by the processor of the mobile device based upon retrieved averaged signal quality measurements, one or more locations along the expected path of the mobile device wherein reduced average signal quality was previously measured;

preemptively adapting the schedule of requests by the processor of the mobile device for the segments of the video stream based upon the identified one or more locations to request and receive one or more segments of the video stream prior to the mobile device entering the one or more locations along the expected path of the mobile device having the reduced average signal quality; and storing the one or more segments of the media stream for subsequent playback of the one or more segments after the mobile device enters the one or more locations along the expected path of the mobile device having the reduced average signal quality;

wherein the adapting comprises comparing an expected duration of a dead zone to the playback time of the media stream and determining if the buffer contains enough of the media stream to maintain playback through the expected duration of the dead zone, and if the buffer does not contain enough of the media stream to maintain playback through the expected duration of the dead zone, determining if sufficient time remains to pre-fetch one or more segments of the media stream before the mobile device enters the dead zone and, if sufficient time remains, pre-fetching the one or more segments, and otherwise adapting a playback rate of the media stream while the mobile device traverses the dead zone.

2. The mobile device of claim 1 wherein the data that indicates the signal quality of the wireless signal is an RSSI value determined by an RF interface of the mobile device.

3. The mobile device of claim 1 wherein the determining of the expected path of the mobile device comprises analyzing, by the processor of the mobile device, previous movements of the mobile device at similar times of the day.

4. The mobile device of claim 1, wherein the automated process comprises the processor of the mobile device creating the schedule of requests for the segments of the video stream based upon the average signal quality of the wireless signal encountered at each of the plurality of locations along the expected path of the mobile device.

5. The mobile device of claim 4 wherein the adapting comprises the processor of the mobile device placing early segment requests by the mobile device for higher quality segments of the media stream to thereby encourage caching of the higher quality segments of the media stream prior to the mobile device approaching a portion of the expected path that has lower average signal quality.

6. The mobile device of claim 5 wherein the adapting further comprises the processor of the mobile device suspending segment requests while the mobile device is in the portion of the expected path that has lower average signal quality.

7. The mobile device of claim 1 wherein the automated process further comprises the processor of the mobile device monitoring its geographic location to identify any deviation from the expected path, and wherein the adapting comprises the processor of the mobile device updating the schedule of requests based upon expected average signal quality at locations on the new expected path.

8. An automated process executed by a mobile device having a processor, memory and input/output interfaces, wherein the automated process comprises:
 measuring, by the mobile device, a signal quality at each of a plurality of various locations as the mobile device visits the various locations to obtain a plurality of signal quality measurements each relating to a quality of a network at one of the various locations;
 averaging, by the mobile device, the signal quality measurements encountered at each of the various locations as the mobile device visits the various locations at different times;
 storing the averaged signal quality measurements in the memory of the mobile device;
 creating, by the mobile device, a schedule of requests for a plurality of segments of a video stream to be placed to a media streaming source via the network;
 determining, by the processor of the mobile device, an expected path of the mobile device;
 retrieving, from the memory by the processor, the averaged signal quality measurements indicating the average signal quality of the wireless signal at each of a plurality of locations along the expected path of the mobile device;
 identifying, based upon retrieved averaged signal quality measurements, one or more locations along the expected path of the mobile device wherein reduced average signal quality was previously measured;
 preemptively adapting the schedule of requests by the mobile device for the segments of the video stream based upon the identified one or more locations to request and receive one or more segments of the video stream prior to the mobile device entering the one or more locations along the expected path of the mobile device having the reduced average signal quality; and
 storing the one or more segments of the media stream in a buffer of the mobile device for subsequent playback of the one or more segments after the mobile device enters the one or more locations along the expected path of the mobile device having the reduced average signal quality;
 wherein the adapting comprises comparing an expected duration of a dead zone to the playback time of the media stream and determining if the buffer contains enough of the media stream to maintain playback through the expected duration of the dead zone, and wherein if the buffer does not contain enough of the media stream to maintain playback through the expected duration of the dead zone, determining if sufficient time remains to pre-fetch one or more segments of the media stream before the mobile device enters the dead zone and, if sufficient time remains, pre-fetching the one or more segments.

9. The automated process of claim 8 further comprising the processor of the mobile device creating the schedule of requests for the segments of the video stream based upon the average signal quality of the wireless signal encountered at each of a plurality of locations along the expected path of the mobile device, and wherein the adapting comprises the processor of the mobile device placing early segment requests to thereby encourage caching of additional segments of the media stream prior to the mobile device approaching a portion of the expected path that has lower average signal quality.

10. The automated process of claim 8 wherein the mobile device is a mobile media player device.

11. The automated process of claim 10 wherein the data that indicates a signal quality of the wireless signal is an RSSI value determined by an RF interface of the mobile device.

12. The automated process of claim 8 wherein the adapting comprises adapting a quality of one or more of the segments of the media stream to preemptively requests higher quality segments prior to the mobile device entering the one or more locations along the expected path of the mobile device having the reduced average signal quality.

13. The automated process of claim 8 wherein the adapting comprises adapting a quality of one or more of the segments of the media stream to preemptively requests lower quality segments prior to the mobile device entering the one or more locations along the expected path of the mobile device having the reduced average signal quality.

14. The automated process of claim 8 wherein, if sufficient time does not remain to pre-fetch the one or more segments of the media stream before the mobile device enters the dead zone, adapting a playback rate of the media stream while the mobile device traverses the dead zone.

* * * * *